United States Patent
Duerk

(10) Patent No.: US 9,201,770 B1
(45) Date of Patent: Dec. 1, 2015

(54) A/B TESTING OF INSTALLED GRAPHICAL USER INTERFACES

(71) Applicant: EMC Corporation, Hopkinton, MA (US)

(72) Inventor: Bryan Duerk, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/140,721

(22) Filed: Dec. 26, 2013

(51) Int. Cl.
G06F 9/44 (2006.01)
G06F 11/36 (2006.01)

(52) U.S. Cl.
CPC .................................... G06F 11/368 (2013.01)

(58) Field of Classification Search
None
See application file for complete search history.

(56) References Cited

U.S. PATENT DOCUMENTS

| 7,975,000 | B2 | 7/2011 | Dixon et al. |
| 8,160,909 | B2 | 4/2012 | Voda et al. |
| 8,583,766 | B2 | 11/2013 | Dixon et al. |
| 2002/0059463 | A1* | 5/2002 | Goldstein ..................... 709/247 |
| 2008/0065702 | A1* | 3/2008 | Dickerson et al. ............ 707/202 |
| 2009/0059757 | A1* | 3/2009 | Haustein et al. ........... 369/53.42 |
| 2013/0219307 | A1 | 8/2013 | Raber et al. |
| 2014/0115039 | A1 | 4/2014 | Dixon et al. |
| 2014/0278198 | A1 | 9/2014 | Lyon et al. |
| 2014/0282049 | A1* | 9/2014 | Lyon et al. .................... 715/744 |

* cited by examiner

Primary Examiner — Philip Wang
(74) Attorney, Agent, or Firm — BainwoodHuang

(57) ABSTRACT

In a computer a graphical user interface (GUI) portion of an application program is instantiated as a core module and variable modules. One of a set of distinct versions of a variable module is selected and for interoperating with the core module, where the versions differ by respective implementations of a user-visible feature. Usage of the GUI involving the user-visible feature is monitored, recorded and reported, including collection of performance information for operations potentially affected by the use of the selected version rather than another version of the variable module. The performance information is transmitted to an evaluation system that collects performance information from a sample population of systems using all the distinct versions of the variable module, and applies statistical analysis to the performance information to yield statistical performance measures for the different implementations, usable to decide whether wider-scale official deployment of a new implementation is desirable.

20 Claims, 4 Drawing Sheets

A/B TESTING OF INSTALLED GRAPHICAL USER INTERFACES

BACKGROUND

The invention relates to the field of application program development, and in particular to methods of testing candidate new versions of user-visible features of a graphical user interface (GUI) forming part of an application deployed widely on user computers.

Existing methods for developing new graphical user interfaces use selective customer interviews prior to or during user interface development in order to identify areas of development. Feedback from the interviews helps guide the design of graphical elements and functionality. For example, users may provide information about a preference for data being presented in one form or another, or about different possible sequences of GUI operations that could be used to perform some higher-level operation, such as an operation of configuring data storage devices in a storage system management application. Once changes to the user interface are made, they are then rolled out in bulk to an entire base of customers.

SUMMARY

The use of customer interviews to guide application development can be inefficient and may occur at the wrong point in the development process. Users may not always realize the most important areas to improve or where they actual spend their time. If information from users is incorrect or incomplete, interviews may actually lead developers to wrong decisions, so that a resulting design does not achieve a desired benefit or (worse) actually degrades the product in some manner. In some cases, a large improvement in some areas could obscure small improvements or even reduced capabilities in other functions.

In contrast to the approaches discussed above, a technique is disclosed for testing the effectiveness of different potential implementations of user interface improvements. The technique reflects a more incremental approach to the development of improvements. It also employs specific, measured performance data obtained during actual use of candidate implementations, and thus avoids drawbacks associated with a more subjective design process.

The disclosed testing technique can be referred to as "A/B" testing as it involves the deployment and use of different versions of a feature under test by different subsets of a sample population of users/systems. In the case of testing one new implementation against an existing implementation, for example, the number of versions is two and they can be identified as the "A" and "B" versions—hence the name "A/B testing." Although particularly suited for testing involving only two versions, the technique is easily extendible to testing of more than two versions.

In particular, a method is disclosed of operating a test controller for A/B testing of a user-visible feature of a graphical user interface provided by an application program executing on subject computer systems. The method includes providing a test version of a "variable" module to a first subset of the subject computer systems. The test version is one of a set of distinct versions of the variable module capable of interoperating with a "core" module of the graphical interface, the distinct versions being substantially similar but differing by respective implementations of the user-visible feature. The test version is provided along with a first selection command directing each of the first subset of subject computer systems to select the test version for use, to the exclusion of others of the set.

The method further includes providing a second selection command to a second distinct subset of the subject computer systems, the second selection command directing each of the second subset of subject computer systems to select another of the distinct versions of the variable module for use, to the exclusion of the test version. Subsequently, performance information is received from each of the subject computer systems and statistical analysis is applied to the received information. The performance information relates to usage of the graphical user interface involving the user-visible feature, and the statistical analysis yields statistical performance measures for the different implementations of the user-visible feature across the distinct versions of the variable module. These performance measures can be used, for example, in assessing whether to incorporate the test version into the official code base to provide a performance enhancement as identified by the testing.

A method is also disclosed of operating a computer system to support evaluation of a user-visible feature of a graphical user interface provided by an application program of the computer system. This method includes instantiating a graphical user interface portion of the application program as a set of modules including a core module providing core functionality and a core module interface for interoperating with a variable module to be included in the set. It further includes selecting one of a set of distinct versions of the variable module and including it in the set of modules to interoperate with the core module using the core module interface, where the distinct versions are substantially similar but differ by respective implementations of the user-visible feature. Usage of the graphical user interface involving the user-visible feature is monitored, recorded and reported, where the recording includes collection of performance information for aspects of operation potentially affected by the use of the selected version rather than other versions of the variable module, and the reporting includes transmission of the performance information to an evaluation system that (1) collects the performance information from subject computer systems of a sample population, the subject computer systems collectively using all the distinct versions of the variable module and providing respective performance information therefor, and (2) applies statistical analysis to the collected performance information to yield statistical performance measures for the different implementations of the user-visible feature across the distinct versions of the variable module.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The following is a brief overview of an example testing process that can be supported by techniques described herein:

1. A customer opts-in to user interface testing during initial installation of an application such as a storage management application, or during later installation of an upgrade. A default may be used by which the opt-in is presented only once per installation, but there may also be an ability to change this setting via an "options" menu to provide other opportunities for opt-in.
2. During an experiment, the participants are divided into two classes, a control and a change group.
3. Both groups receive an update delivered as a secure code update using a standard management application upgrade mechanism. The update is installed like all regular customer upgrades. An algorithm enables the change group to use the test modules, and testing may be delayed to allow for sufficient updates to occur before testing begins. The testing process does not require connection to the update or evaluation system.
4. Operation is monitored, and measurements are collected and recorded locally and delivered to an evaluation system for analysis. Measurements are batched and sent to the evaluation system asynchronously. This allows for intermittent or low bandwidth connections between the monitored and evaluation systems.
5. Data for the different test groups are compared using standard statistical methods. Any statistically significant differences can be reviewed to determine whether a candidate implementation provides a desired benefit, in which case the candidate implementation might be incorporated into an official current release of the application.

Figure 1:
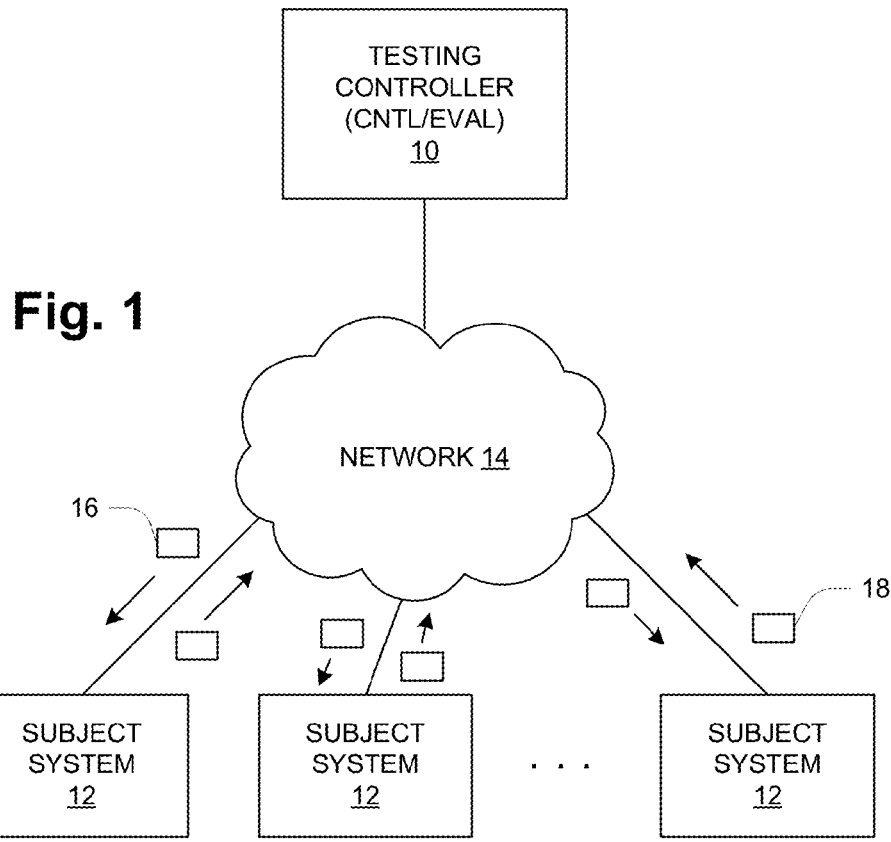
FIG. 1 is a block diagram of a set of computer systems forming an A/B testing environment.

FIG. 1 shows a distributed system providing a platform for A/B testing of features of a graphical user interface (GUI). The system includes a testing controller 10 coupled to subject systems 12 via a network 14. Also depicted is a flow of certain types of information, namely code modules 16 that are constituents of a GUI to be tested (these flowing from test controller 10 to subject systems 12) and reports 18 including performance and other information gathered during use of the GUI, serving as raw test result information (these flowing from the subject systems 12 to the test controller 10). The test controller 10 performs functions of test control (CNTL) and evaluation (EVAL). In practice it may be realized by a single computer system or a set of computer systems executing test control and evaluation programs that implement the functionality described herein. A subject system 12 is a computer system executing a GUI that is the subject of the A/B testing as generally described above and more particularly described below.

Figure 2:
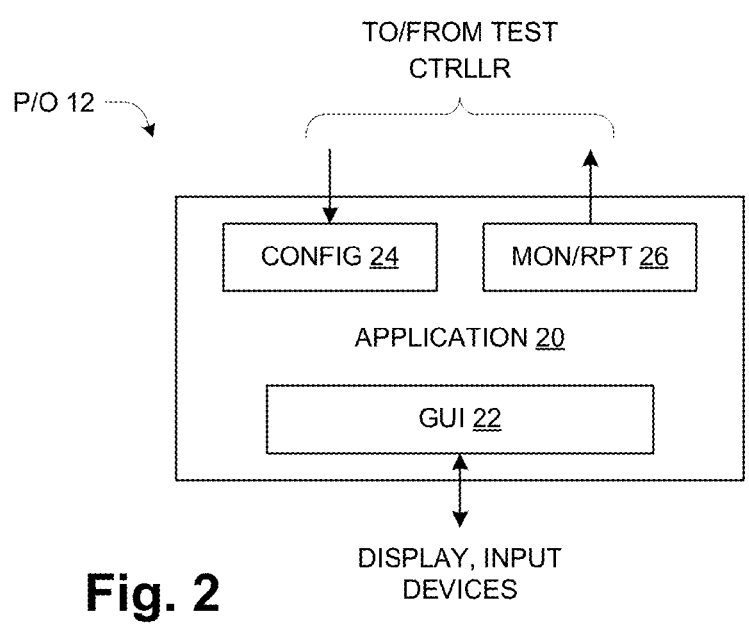
FIG. 2 is a schematic block diagram of an application program in a subject computer system.

FIG. 2 shows a subject system 12 from a software perspective. It includes an application program (application) 20 that itself includes a GUI 22, a configuration module 24, and a monitoring/reporting (MON/RPT) module 26. The configuration and monitoring/reporting modules 24, 26 are communicatively coupled to the test controller 10 of FIG. 1. The GUI 22 is connected to a local display device and user input device(s) such as a keyboard, mouse, touch sensor of a touch-screen display, etc.

In operation, the application 20 employs the GUI 22 to display information to a user and to receive input from the user, the input including control-type input (e.g., clicking a mouse button on a displayed control) and in some cases data-type input (e.g., an alphanumeric string to be used as a label for an item shown on the display). In one embodiment, the application 20 is a storage management application used to monitor and control the operation of a network of data storage arrays, such as an application sold under the trademark UNISPHERE® by EMC Corporation. The GUI 22 may use windows, tabbed panes, tables and similar display objects to display a variety of information, such as information about a collection of managed items such as storage arrays in a storage management application.

The configuration module 24 is used to organize or configure the GUI 22 in support of the A/B testing as described in more detail below. The configuring activity is performed under control of the test controller 10. In practice the configuration module 24 may include conventional software update and patching functionality as generally known in the art. In this case the test-configuring functionality might be realized as an extension to an existing configuration module used for such purposes with respect to the application 20.

The monitoring/reporting module 26 is used to monitor, record and report on certain aspects of operation of the GUI 22 insofar as may be relevant to A/B testing being performed. Any of a variety of aspects of operation may be monitored and reported on, such as timing of operation, pattern of operation, occurrence of errors/cancellations, etc. The test controller 10 may specify the information to be gathered and reported, or in other cases the monitoring/reporting module may operate more independently and gather and report a wide variety of information that is selectively used by the test controller 10. Several examples are given below of different aspects of operation that may be monitored and reported on.

The systems 12 may include a system maintenance program having a maintenance channel to a remote update control process for performing periodic maintenance updates to the application program 20. In this case, communication of control commands to the configuration module 24 may occur via the maintenance channel.

Figure 3:
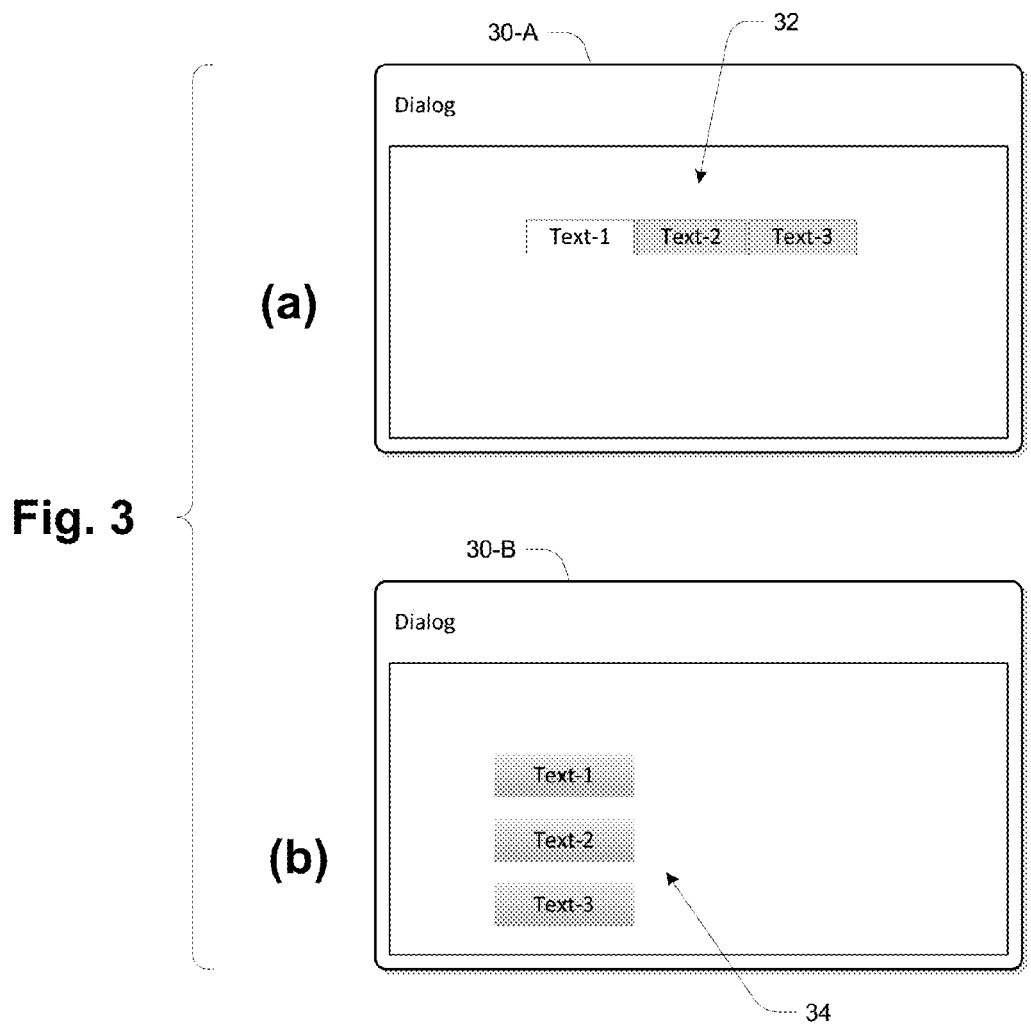
FIG. 3 is a depiction of two distinct implementations (A), (B), of a feature of a graphical user interface.

FIG. 3 illustrates a simplified example of a user-visible feature that could be the subject of A/B testing. Two versions 30-A and 30-B of a dialog window of the GUI 22 are shown. These versions differ with respect to a feature in the form of a "tab group" of buttons, i.e., a set of user-activated buttons that can be successively selected by use of the "tab" key on a keyboard. The "A" version of the dialog window 30-A has a horizontal arrangement 32 of the tab group, while the "B" version of the dialog window 30-B has a vertical arrangement 34. It is assumed that a developer or maintainer of the GUI 22 wants to know whether there is an interesting and/or valuable difference in how the GUI performs based on whether the A arrangement 32 or the B arrangement 34 is used. Thus the A/B testing method is used. One group of the subject systems 12 (FIG. 1) uses the A arrangement 32, while another group uses the B arrangement 34. The testing components of the system co-operate to collect and analyze performance data (as described more below) to ascertain the existence and extent of any such difference.

Figure 4:
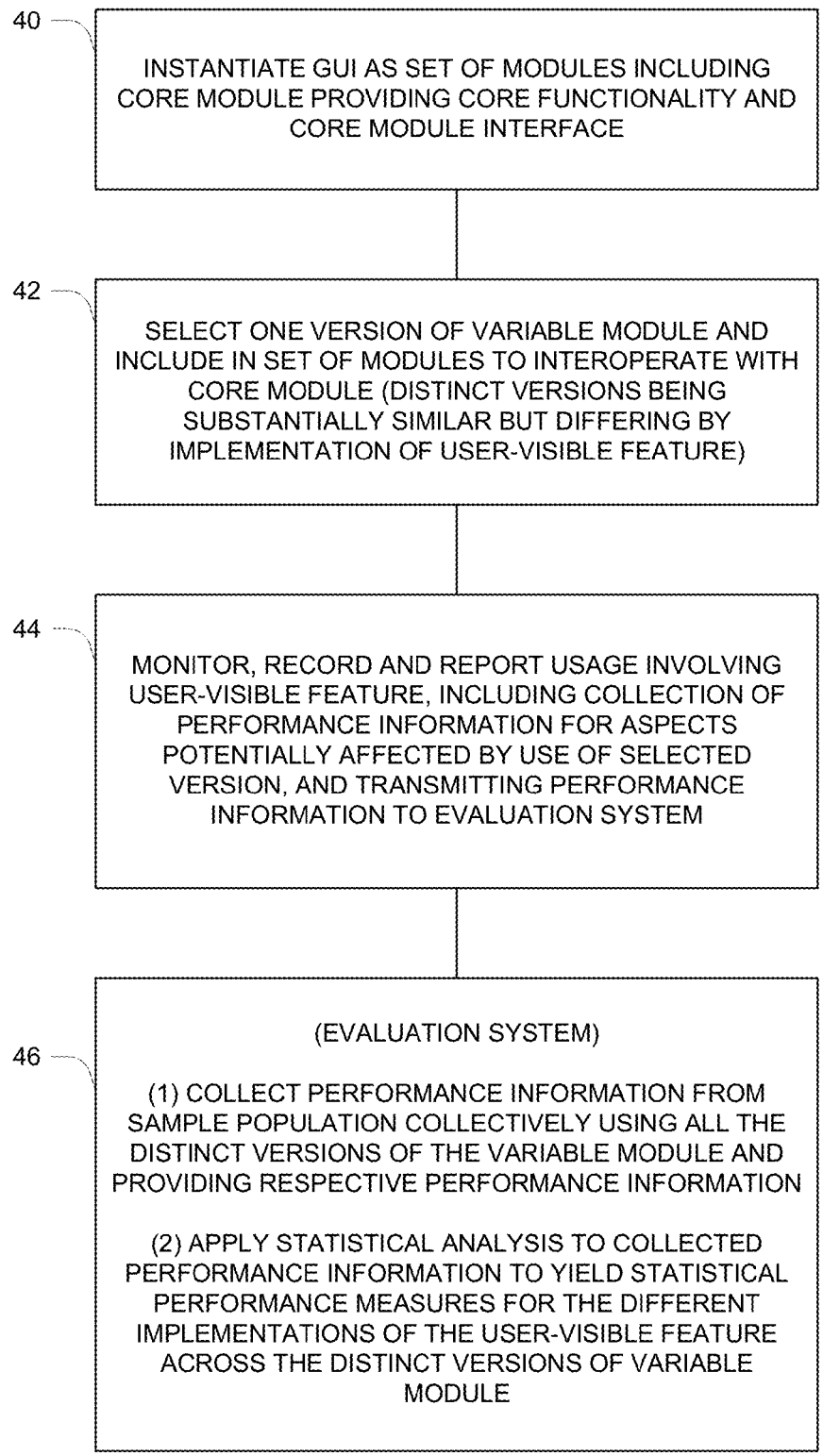
FIG. 4 is a high-level flow diagram of an A/B testing method as performed at a subject computer system.

FIG. 4 is a flow diagram of the A/B testing method primarily as performed at a subject system 12, in cooperation with the test controller 10. The method is performed to support evaluation of a user-visible feature of a graphical user interface 22 provided by an application program 20 of the subject systems 12.

At 40, a GUI portion (e.g., GUI 22) of an application program 20 is instantiated as a set of modules that includes a core module and one or more "variable" modules, i.e., modules that may be subject to A/B testing and are therefore variable in terms of which version is actually in use at a given time. The core module provides core functionality and a core module interface for interoperating with variable modules to be included in the set of instantiated modules. The core/variable distinction is explained more below.

At 42, one of a set of distinct versions of the variable module is selected and included in the set of modules to interoperate with the core module using the core module interface. The distinct versions are substantially similar but differ by respective implementations of the user-visible feature. Referring to the example of FIG. 3, the dialog panes are generally similar, but one version implements the horizontal tab group 32, while another version implements the vertical tab group 34.

At 44, the use of the graphical user interface as involving the user-visible feature is monitored, recorded and reported. The recording includes collection of performance information for aspects of operation potentially affected by the use of the selected version rather than other versions of the variable module, and the reporting includes transmission of the performance information to an evaluation system (e.g., evaluation portion of test controller 10). Referring to the example of FIG. 3, one aspect of operation might be any backward tabbing that occurs, indicating that the user has gone past a desired selection and has to back up to it. The respective rates of backward tabbing for the two versions A, B might reflect a performance difference—one version might be less likely to contribute to such over-shooting of a desired selection.

Step 46, performed at the evaluation system, includes (1) collecting the performance information from computer systems of a sample population, the computer systems collectively using all the distinct versions of the variable module and providing respective performance information therefor, and (2) applying statistical analysis to the collected performance information to yield statistical performance measures for the different implementations of the user-visible feature across the distinct versions of the variable module. Continuing with the above example, this analysis might involve calculating a normalized frequency of backward tabbing from the data provided by each subject system 12, placing each calculated value in the appropriate category A or B depending on the version in use on the respective system, then calculating statistics for the A and B collections and comparing these statistics. For example, it can be determined whether there is a statistically significant difference in the average backward tabbing frequencies that might suggest that one version provides better performance in this respect.

The meaning and significance of "core" versus "variable" will necessarily vary for different types and designs of GUIs. The general idea is that the "core" includes basic functions and presentation that are expected to change infrequently or never, while the "variable" includes functions and presentation that the GUI designer/developer knows might be the subject of change for a variety of reasons, such as optimizing performance. In the example of FIG. 3, the core might include the presentation of the dialog window 30, the three possible user selections (perhaps dictated by the application 20), and the tabbing functionality, while the variable includes the specific layout and appearance of the tab groups 32, 34.

Figure 5:
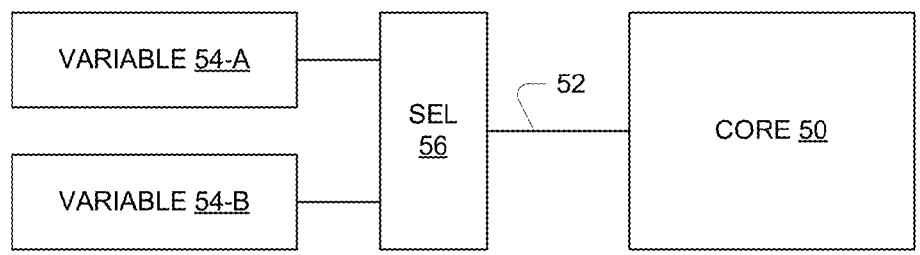
FIG. 5 is a schematic block diagram of an organization of a computer system for supporting A/B testing.

FIG. 5 is a schematic depiction of an organization of the GUI 22 to support A/B testing as described herein. As mentioned above, it is organized into modules to provide a desired interchangeability. In particular, it includes one or more modules 50 each providing a core application programming interface (API) 52, as well as respective sets of variable modules 54, where each variable module 54 has two or more versions A, B, etc. Associated with the set of variable modules 54 is a selector (SEL) 56, which is controlled by the configuration module 24 of FIG. 2. In operation at a particular subject system 12, the selector 56 is controlled to establish a functional connection between the core module 50 and a one of the variable module versions 54-A, 54-B, etc. In one typical use when selecting among n versions for testing, each distinct version is selected in roughly 1/n of the subject systems 12. Thus if n=2, for example, then one-half the systems 12 have version A selected and the other half have version B selected.

It will be appreciated that one application for the disclosed technique is for testing an individual candidate improvement (new version or test version) against an existing released implementation (baseline version). The above described organization and operation support this kind of testing by taking the "A" version as the baseline, for example, and the "B" version as the test version whose performance is being evaluated against that of the baseline.

Figure 6:
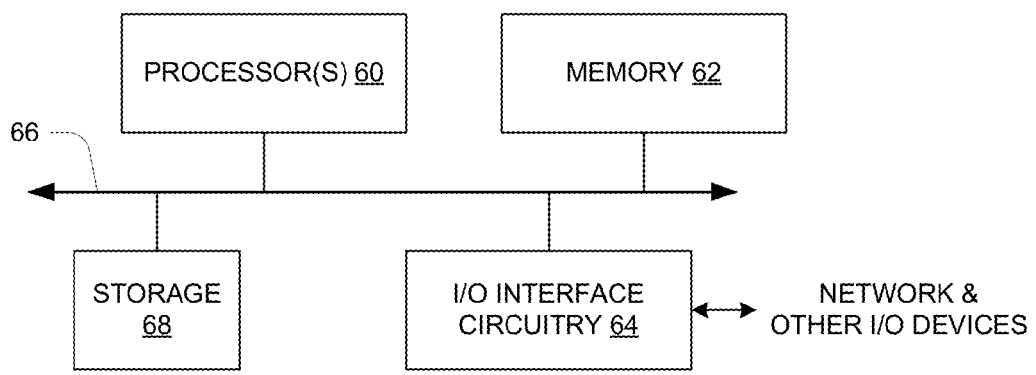
FIG. 6 is a schematic block diagram of a computer from a hardware perspective.

FIG. 6 shows an example configuration of a physical computer or controller from a computer hardware perspective. The hardware includes one or more processors 60, memory 62, and interface circuitry 64 interconnected by data interconnections 66 such as one or more high-speed data buses. The interface circuitry 64 provides a hardware connection to the network 14 (FIG. 1) and perhaps other external devices/connections. The processor(s) 60 with connected memory 62 may also be referred to as "processing circuitry" herein. As mentioned, there may also be local storage 68 such as a local-attached disk drive or Flash drive. In operation, the memory 62 stores data and instructions of system software (e.g., operating system) and one or more application programs which are executed by the processor(s) 60 to cause the hardware to function in a software-defined manner. Thus the computer hardware executing instructions of a GUI, such as described above, can be referred to as a GUI circuit or GUI component, and it will be understood that a collection of such circuits or components can all be realized and interact with each other as one or more sets of computer processing hardware executing different computer programs as generally known in the art.

The following are aspects of the application 20 for supporting the presently disclosed testing techniques:

1. Preferably collects fine-grained metrics on user actions such as page flows, clicks, time spent per page, time spent on overall operation (e.g., configuring a new storage device), etc.

2. Integrate with call-home functionality to report collected data. Data is preferably reported in a way that preserves user anonymity, e.g., by removing any user-identifying information before forwarding to the evaluation system.

3. Include a facility to enable a user to opt-in the testing procedure, both for initial metric collection and individual tests. Opting in does not equate to receiving test versions of modules—for a given test a system may be in a control group that continues to use a currently released module ("baseline").

4. Include an abstraction for changing specific components of the user interface. This may use the same mechanism used for regular upgrades and patches. The abstraction should allow for either/both (a) rolling users forward to a new version upon successful testing, and (b) rolling users back from a test version to an existing baseline version upon unsuccessful testing.

5. Asynchronously uploading performance data to the evaluation system, which produces a test analysis to determine the effect of changes to the application 20 (specifically the GUI 22).

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer system to support evaluation of a user-visible feature of a graphical user interface provided by an application program of the computer system, comprising:
    instantiating a graphical user interface portion of the application program as a set of modules including a core module providing core functionality and a core module interface for interoperating with a variable module to be included in the set;
    selecting one of a set of distinct versions of the variable module and including it in the set of modules to interoperate with the core module using the core module interface, the distinct versions differing by respective implementations of the user-visible feature; and
    monitoring, recording and reporting usage of the graphical user interface involving the user-visible feature, the recording including collection of performance information for aspects of operation potentially affected by the use of the selected version rather than other versions of the variable module, the reporting including transmission of the performance information to an evaluation system that (1) collects the performance information from subject computer systems of a sample population, the subject computer systems collectively using all the distinct versions of the variable module and providing respective performance information therefor, and (2) applies statistical analysis to the collected performance information to yield statistical performance measures for the different implementations of the user-visible feature across the distinct versions of the variable module.

2. A method according to claim 1, wherein the set of distinct versions includes exactly two versions, one being a baseline version in current widespread use beyond the subject computer systems, and the other being a new version being tested for performance differences with respect to the baseline version.

3. A method according to claim 2, wherein the baseline version is the version selected for inclusion in the set of modules, and further including, in response to a command from a remote test controller after the evaluation system has performed the statistical analysis, a roll-forward operation including de-selecting the baseline version and selecting the new version for indefinite future use in the graphical user interface.

4. A method according to claim 2, wherein the new version is the version selected for inclusion in the set of modules, and further including, in response to a command from a remote test controller after the evaluation system has performed the statistical analysis, a roll-back operation including de-selecting the new version and selecting the baseline version for indefinite future use in the graphical user interface.

5. A method according to claim 1, wherein the set of distinct versions includes a baseline version in current widespread use beyond the subject computer systems, and a plurality of candidate new versions being tested for performance differences with respect to the baseline version.

6. A method according to claim 1, further including receiving a selection control command from a remote test controller, and wherein the selecting is performed in response to and in accordance with the selection control command.

7. A method according to claim 6, further including execution of a system maintenance program having a maintenance channel to a remote update control process for performing periodic maintenance updates to the application program, and wherein (i) the selection control command is received via the maintenance channel, and (ii) the selecting of a version of the variable module is performed by the system maintenance program based on receiving the selection control command via the maintenance channel.

8. A method according to claim 1, wherein the computer system includes call-home functionality used to communicate status and diagnostic information about the computer system to a remote support computer, and the performance information is transmitted to the evaluation system using the call-home functionality.

9. A method according to claim 1, further including modification of recorded performance data to remove user-identifying information therefrom prior to reporting the modified performance data to the evaluation system.

10. A method according to claim 1, wherein the usage of the graphical user interface subject to monitoring, recording and reporting includes one or more of page flows, clicks, time on page, and time for a multi-page operation.

11. A method of operating a test controller for NB testing of a user-visible feature of a graphical user interface provided by an application program executing on subject computer systems, comprising:
    providing a test version of a variable module to a first subset of the subject computer systems, the test version being one of a set of distinct versions of the variable module capable of interoperating with a core module of the graphical interface, the distinct versions differing by respective implementations of the user-visible feature, the test version being provided along with a first selection command directing each of the first subset of subject computer systems to select the test version for use to the exclusion of others of the set;
    providing a second selection command to a second distinct subset of the subject computer systems, the second selection command directing each of the second subset of subject computer systems to select another of the distinct versions of the variable module for use to the exclusion of the test version; and
    subsequently receiving performance information from each of the subject computer systems and applying statistical analysis thereto, the performance information relating to usage of the graphical user interface involving the user-visible feature, the statistical analysis yielding statistical performance measures for the different implementations of the user-visible feature across the distinct versions of the variable module.

12. A method according to claim 11, wherein the set of distinct versions includes exactly two versions, one being a baseline version in current widespread use among the subject computer systems, and the other being the test version which is a new version being tested for performance differences with respect to the baseline version.

13. A method according to claim 12, further including, in response to the statistical performance measure indicating a performance improvement for the new version, providing a third selection command to the second subset of subject computer systems directing each of the second subset of subject computer systems to select the new version for indefinite future use in the graphical user interface.

14. A method according to claim 12, further including, in response to the statistical performance measure indicating no performance improvement for the test version, providing a third selection command to the first subset of subject computer systems directing each of the first subset of subject computer systems to select the baseline version for indefinite future use in the graphical user interface.

15. A method according to claim 11, wherein the set of distinct versions includes a baseline version in current widespread use among the subject computer systems, and a plurality of candidate new versions being tested for performance differences with respect to the baseline version.

16. A method according to claim 11, wherein each subject computer system executes a system maintenance program having a maintenance channel to a remote update control process for performing periodic maintenance updates to the application program, and wherein the selection commands are transmitted to the subject computer systems via the respective maintenance channels.

17. A method according to claim 11, wherein the usage of the graphical user interface subject to monitoring, recording and reporting includes one or more of page flows, clicks, time on page, and time for a multi-page operation.

18. A method according to claim 1, further including receiving, by the computer system at the time of instantiating the graphical user interface portion of the application, an opt-in of a customer to participate in the evaluation of the user-visible feature of the graphical user interface, and wherein the selecting, monitoring, recording and reporting are performed only upon receiving the opt-in of the customer.

19. A method according to claim 1, further including (i) receiving the selected version of the variable module as a secure code update using a standard management application upgrade mechanism, and (ii) installing the secure code in a manner used also used for installing other upgrades to the application program.

20. A method according to claim 1, wherein the computer system includes a computer executing the application program including the graphical user interface, a configuration module, and a monitoring/reporting module, the configuration module and monitoring/reporting modules being communicatively coupled to a test controller to which the usage of the graphical user interface is reported, the graphical user interface being connected to a local display device and a local user input device of the computer.

* * * * *